(12) United States Patent
Krecké

(10) Patent No.: US 8,677,706 B2
(45) Date of Patent: Mar. 25, 2014

(54) BUILDING WALL WITH FLUID DUCTS AS ENERGY BARRIERS

(71) Applicant: Edmond D. Krecké, Wiesbaden (DE)

(72) Inventor: Edmond D. Krecké, Wiesbaden (DE)

(*) Notice: Subject to any disclaimer, the term of this patent is extended or adjusted under 35 U.S.C. 154(b) by 0 days.

(21) Appl. No.: 13/833,025

(22) Filed: Mar. 15, 2013

(65) Prior Publication Data

US 2013/0276390 A1    Oct. 24, 2013

Related U.S. Application Data

(63) Continuation of application No. 11/996,255, filed as application No. PCT/EP2006/000182 on Jan. 11, 2006, now abandoned.

(30) Foreign Application Priority Data

Jul. 22, 2005   (DE) .......................... 10 2005 034 970

(51) Int. Cl.
*E04B 1/70*    (2006.01)
(52) U.S. Cl.
USPC ..................................... 52/302.3; 52/309.12
(58) Field of Classification Search
USPC ......... 52/309.12, 302.3, 173.3; 126/617, 621, 126/633, 745.07; 165/45, 168, 169, 49, 56, 165/57, 47, 53; 237/69; 62/451
See application file for complete search history.

(56) References Cited

U.S. PATENT DOCUMENTS

| | | | |
|---|---|---|---|
| 4,001,990 A | 1/1977 | Chase et al. | |
| 4,054,246 A | 10/1977 | Johnson | |
| 4,164,933 A | 8/1979 | Alosi | |
| 4,257,481 A | 3/1981 | Dobson | |
| 4,267,822 A | 5/1981 | Diamond | |
| 4,408,596 A | 10/1983 | Worf | |
| 4,416,265 A | 11/1983 | Wallace | |
| 4,442,826 A | 4/1984 | Pleasants | |
| 7,028,685 B1 | 4/2006 | Krecke | |
| 2008/0086981 A1 | 4/2008 | Killkis et al. | |
| 2009/0236074 A1 | 9/2009 | Flynn et al. | |

FOREIGN PATENT DOCUMENTS

| | | |
|---|---|---|
| AT | 410956 B | 9/2003 |
| DE | 2710053 A1 | 9/1977 |
| DE | 2847905 A1 | 5/1980 |
| DE | 3710388 A1 | 7/1988 |
| DE | 19740074 A1 | 3/1999 |
| DE | 10025642 A1 | 11/2001 |
| EP | 0618335 A1 | 10/1994 |
| EP | 0895035 A2 | 2/1999 |
| EP | 0976886 A2 | 2/2000 |
| FR | 2577959 A1 | 8/1986 |
| FR | 2675182 A1 | 10/1992 |
| WO | 9721962 A1 | 6/1997 |

OTHER PUBLICATIONS

Gabler, Sefanie, "DE Application No. 10 2005 034 970.6 Office Action ", Dec. 8, 2011, Publisher: DPMA, Published in: DE.

(Continued)

*Primary Examiner* — Jeanette E Chapman
*Assistant Examiner* — Daniel Kenny
(74) *Attorney, Agent, or Firm* — Kaplan, Breyer, Schwarz & Ottesen, LLP (57) ABSTRACT

The invention relates to a wall or roof surface element comprising a temperature barrier layer and an extremely thin external insulating layer. Alternatively, an absorption layer can also be provided on the external side. A building fitted with said type of elements has a positive energy balance.

13 Claims, 5 Drawing Sheets

(56) References Cited

OTHER PUBLICATIONS

H. Rohrig, "German Patent Application No. 10 2005 034 970 6 Office Action", Dec. 1, 2008, Publisher: German Patent Office, Published in: DE.

M. Van Dooren, "Related International Patent Application No. PCT/EP2006/000182 International Search Report", Apr. 6, 2006, Publisher: PCT, Published in: EP.

Marc Van Dooren, "Related International Patent Application No. PCT/EP2006/000182 International Preliminary Report on Patentability", Jul. 2, 2007, Publisher: PCT, Published in: EP.

BUILDING WALL WITH FLUID DUCTS AS ENERGY BARRIERS

CROSS-REFERENCE TO RELATED APPLICATIONS

This application is a Continuation of and claims priority to U.S. patent application Ser. No. 11/996,255 with a 371 entry date of Jan. 18, 2008, which is the 371 filing of International Application Serial Number PCT/EP2006/000182 filed on Jan. 11, 2006, which in turn claims priority to German Application Number DE 10 2005 034 970.6 filed on Jul. 22, 2005. Furthermore, U.S. patent application Ser. No. 11/996,255 is incorporated herein by reference.

FIELD OF THE INVENTION

The invention pertains to a building wall with fluid ducts as temperature barriers and to a roof surface with fluid ducts as temperature barriers, as well as to a method for manufacturing a roof surface according to the invention.

BACKGROUND OF THE INVENTION

Building walls with fluid ducts that act as thermal barriers are known. For example, German OLS DE 298 04 095, entitled "Low-energy House," discloses a building wall with a core zone that features fluid lines. In such walls that are equipped with a temperature barrier, it is possible to feed in low-temperature energy such as geothermal heat for air-conditioning purposes. Consequently, temperatures below 18° C., particularly geothermal heat in the form of solar energy, can also be used for air-conditioning purposes.

SUMMARY OF THE INVENTION

One disadvantage of known exterior walls of low-energy houses is that they usually have a substantial wall thickness. For example, a conventional highly insulated exterior wall for low or passive building technology requires exterior insulation with a thickness of up to 35 cm, and even building walls with prior-art temperature barriers feature slightly thinner insulating layers.

In contrast, the invention is based on the objective of making available an exterior wall or a roof surface that makes it possible to realize the exterior wall and the roof as thinly as possible.

Another objective of the invention consists of simultaneously using a temperature barrier integrated into the wall for energy generation purposes at correspondingly high outdoor temperatures.

Another objective of the invention consists of making available a building wall or roof surface that makes it possible to achieve a gain in thermal energy relative to the annual mean.

The objective of the invention is realized surprisingly simply with an exterior wall or roof surface.

According to the invention, an exterior wall or roof surface for a building is provided with at least one temperature barrier layer comprising fluid ducts. The temperature barrier layer is surrounded by insulating layers on both sides. According to the invention, the thickness of the insulating layer on the outer side of the temperature barrier layer, i.e., the exterior side, is smaller than that of the insulating layer on the inner side.

The inventor has recognized that a small amount of thermal insulation on the outer side makes it possible to use the temperature barrier layer through which a fluid is preferably conveyed not only as a temperature barrier layer, but also as a collector layer at correspondingly high outdoor temperatures.

It was surprisingly determined that an exterior wall designed in this way makes it possible to achieve a temperature gain relative to the annual mean. The wall thickness can be simultaneously reduced. This means that, surprisingly, a low installation expenditure makes it possible to achieve a positive energy balance in comparison with a wall provided with higher exterior insulation.

In order to use this temperature gain, the invention proposes to connect the fluid ducts to a heat reservoir arranged beneath the building.

With respect to details of the design and control of a low-energy building with a heat reservoir and exterior walls with a temperature barrier layer, reference is made to German OLS DE 29 04 095 entitled "Low-energy House," as well as to European OLS EP 850 388 entitled "Energy System for Buildings" and EP 10 624 63 entitled "Air-conditioning of Buildings as well as Air-conditioned Building, particularly Zero-energy Building," the entire disclosure of which is hereby incorporated into the present application by reference.

In addition to a gain in thermal energy relative to the annual mean, the invention makes it possible to realize an altogether thinner exterior wall or roof surface. The invention therefore is intended, in particular, for upgrading old buildings.

The thickness of the insulating layer on the outer side preferably amounts to less than 80%, preferably less than 60%, most preferably less than 40% of the thickness of the insulating layer on the inner side.

It was determined that an insulating layer thickness of less than 40% on the outer side already results in a sufficient temperature barrier while still realizing a gain in thermal energy relative to the annual mean.

In one preferred embodiment of the invention, the thickness of the insulating layer on the outer side amounts to less than 10 cm, preferably less than 8 cm, most preferably less than 6 cm. It was determined that thicknesses of 5 cm on the outer side is already sufficient for keeping the outward heat losses at very cold temperatures low enough that the house can still be kept warm by means of the temperature barrier layer.

According to another refinement of the invention, another fluid-conducting layer that is realized in the form of an absorption layer is arranged on the outer insulating layer. This makes it possible to collect thermal energy via the absorption layer during the summer months. The absorption layer is either provided with another insulating layer or is directly provided with an exterior layer, for example, a plaster layer.

According to another refinement of the invention, the exterior walls or roof surfaces are respectively realized in the form of modular elements. These modular elements can be delivered in a completely assembled state and serve as a building wall or roof surface. The invention not only includes embodiments in which finished wall elements are delivered which are already provided with a corresponding exterior layer, for example, a plaster layer or roof covering, but also embodiments in which the corresponding elements still must be provided with an exterior layer, particularly a roof covering.

In one particular embodiment of the invention, the temperature barrier layer comprises fluid ducts that are embedded in a concrete core, particularly fluid ducts realized in the form of pipes or hoses.

According to the invention, the exterior wall is produced in accordance with the formwork technique, i.e., a formwork of insulating material such as polystyrene is erected and the corresponding lines are arranged in a core zone before the core zone is filled with concrete, wherein the core zone acts as a heat reservoir as well as a support layer.

Preferably, polypropylene pipes are used as fluid ducts. Such a plastic material is particularly durable and therefore suitable for the construction of buildings.

According to one preferred embodiment of the invention, the insulating layer consists of foamed material, particularly of foamed polystyrene. Such insulating materials are, for the most part, inflammable and furthermore particularly light and durable.

According to another refinement of the invention, the exterior wall or roof surface comprises at least one carrier plate, particularly an OSB (Oriented Strand Board) plate, i.e., multilayered particle board, on which an insulating layer is arranged.

Such a carrier plate, particularly in the form of particle board, is very suitable for constructing a roof surface. In this case, carrier plates are fixed on the lower side of a rafter roof. An insulating layer, a temperature barrier layer, an insulating layer and the roof covering can then be successively applied onto the upper side of the carrier plate.

It is particularly preferred that the temperature barrier layer is formed by lines installed in a meandering fashion.

According to a preferred embodiment of the invention, the thickness of the entire exterior wall or roof surface is less than 35 cm, preferably less than 30 cm, most preferably less than 25 cm.

Thus, the invention makes it possible to realize exterior walls with a total thickness that is less than that of just the insulation of a conventional highly insulated exterior wall.

Since it is possible to achieve thicknesses of less than 25 cm, the inventive exterior wall is particularly suitable for modernizing old buildings.

According to another refinement of the invention, photocells are arranged at least in sections on the outside of the exterior wall or roof surface. A wall designed in this way not only results in a gain in thermal energy, but also an energy gain in the form of current.

In this case, conventional silicon solar cells, as well as new types of thin-film solar cells, particularly zinc-oxygen, zinc-selenium or copper-indium-selenite cells, may be considered as photocells.

The invention furthermore pertains to an alternative embodiment, in which an exterior wall or roof surface for buildings is provided with at least one first temperature barrier layer that comprises fluid ducts, on the outside of which at least one first insulating layer is arranged. According to this alternative embodiment of the invention, another absorption layer that comprises fluid ducts is arranged on the outside of this first insulating layer.

Consequently, this embodiment of the invention comprises two layers with fluid ducts, wherein the inner layer with fluid ducts is primarily intended as a temperature barrier layer and the outer layer with fluid ducts is primarily intended as an absorption layer. The absorption layer makes it possible to generate and feed thermal energy to a reservoir if correspondingly high temperatures are present in the wall. The temperature barrier layer is used for evenly heating the building.

Such a construction surprisingly makes it possible to realize extremely thin exterior wall thicknesses.

According to a preferred embodiment of the invention, another insulating layer is arranged on the outside of the absorption layer. This protects the absorption layer from particularly low temperatures that could lead to a change in the state of aggregation of the fluid flowing through the fluid ducts.

According to a preferred embodiment of the invention, the thickness of the first or second insulating layer is less than 5 cm, particularly less than 2 cm. It was determined that such thin insulating layers are sufficient for achieving adequate thermal insulation in an inventive combination of temperature barrier and absorption layer.

This embodiment also makes it possible to realize exterior walls with a total thickness between less than 35 cm and less than 25 cm.

The invention furthermore pertains to a low-energy house or energy-gain house that is designed, in particular, with an exterior wall or roof surface according to the invention. The low-energy house features a temperature barrier layer that comprises fluid ducts and at least one insulating layer, wherein the thickness of the insulating layer on the outer side, i.e., the side located outward of the temperature barrier layer, is less than 10 cm, preferably less than 8 cm, most preferably less than 6 cm.

It was determined that, surprisingly, it is energetically favorable to use thin exterior walls with a temperature barrier.

According to the invention, the heat loss caused by the relatively thin insulating layer on the outer side is more than compensated by the gain in thermal energy at relatively high outdoor temperatures in an accordingly designed low-energy house or energy-gain house.

An energy gain relative to the annual mean can be achieved with a corresponding wall with energy barrier.

In a preferred embodiment of the low-energy house or energy-gain house, an underground heat reservoir that is connected to the exterior wall or roof surface by means of fluid ducts is arranged beneath the low-temperature house or energy-gain house. This heat reservoir serves for storing the heat generated by the absorption layer and the temperature barrier layer during the warm times of the year. During the winter months, the heat can be returned to the building by means of corresponding fluid lines and valves. The heat reservoir may simultaneously form part of a system that uses geothermal heat for feeding the temperature barrier layer. With respect to additional details, reference is made to the aforementioned OLS.

The fluid lines are preferably filled with a water-antifreeze mixture. Thus, freeze damage in the outer absorption regions can be prevented at extremely low temperatures.

The invention furthermore pertains to a method for producing a roof surface. In this case, carrier plates are fixed beneath the roof rafters. An insulating layer is initially bonded to or clamped on the carrier plates. Fluid-conducting lines are then applied on the insulating layer before another insulating layer is applied. Finally, the roof is provided with a roof covering. Consequently, a roof with an inventive fluid-conducting layer that can either be used as a temperature barrier layer and/or as an absorption layer can be very easily realized.

According to a preferred embodiment, the fluid-conducting lines are embedded in a sealing compound. Another insulating layer can be directly applied to the still liquid sealing compound so that the sealing compound and the insulating layer are connected together. This makes it possible very easily to construct a corresponding roof surface. However, it is not necessary to seal the fluid-conducting lines because they are protected from environmental influences by the roof covering. A thereby designed roof surface provides the particular advantage that it is arranged between the rafters of the roof such that no space is lost.

According to another refinement of the invention, another layer with fluid-conducting lines is applied which is preferably realized in the form of an absorption layer. This makes it possible to manufacture a roof surface with two layers of fluid-conducting lines, wherein the upper layer is used as an absorption layer and the lower layer is used as a temperature barrier layer.

It is preferred that an insulating layer be provided between the layers and above the additional fluid-conducting layer.

BRIEF DESCRIPTION OF THE DRAWINGS

The invention is described in greater detail below with reference to FIGS. 1-3.

DETAILED DESCRIPTION

Figure 1:
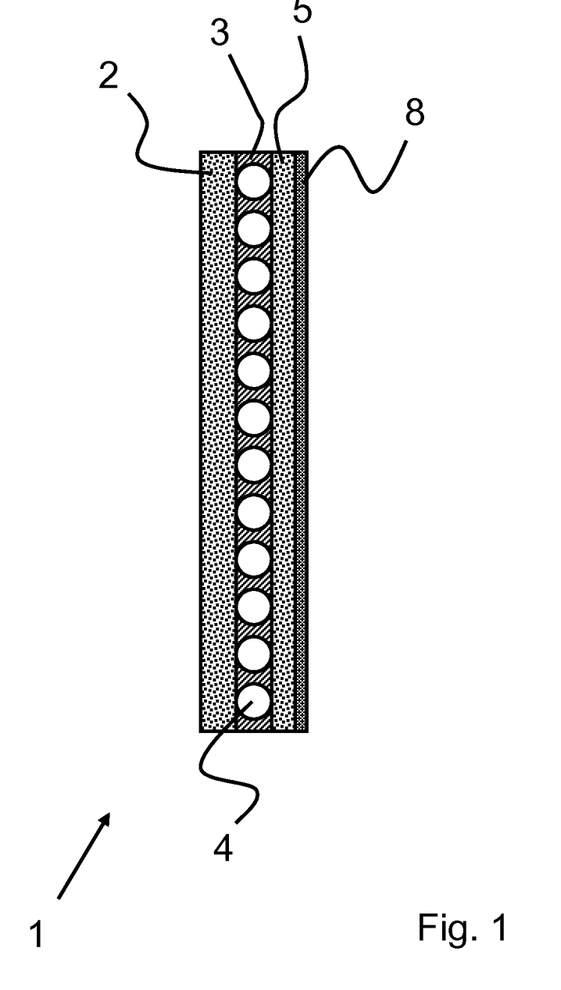
FIG. 1 shows a schematic cross-sectional representation of an inventive wall or roof surface element.

FIG. 1 schematically shows an inventive wall or roof surface element 1 that is realized in the form of a modular element suitable for use in the construction of prefabricated buildings as well as the modernization of old buildings.

The wall element 1 comprises an inner insulating layer 2 and an outer insulating layer 5. A temperature barrier layer 3 is arranged between the inner insulating layer 2 and the outer insulating layer 5. The temperature barrier layer 3 comprises fluid lines 4 through which a water-antifreeze mixture can circulate. An exterior layer 8 provided on the outer side comprises a fiberglass mat covered with plaster in order to protect the wall or roof surface element 1 from weather effects. According to the invention, the wall or roof surface element is extremely thin, i.e., it is realized with a thickness of less than 35 cm. Such a thin exterior wall makes it possible to achieve very high efficiencies with respect to the mean annual energy gain. As soon as the outdoor temperature exceeds the indoor temperature, energy can be fed to a (not-shown) reservoir system. During the winter months, the (not-shown) building can be fed from an underground reservoir. In addition, production costs, storage and transport costs as well as assembly costs are lowered due to the thin design of the wall. In addition, thinner walls make it possible to increase the living area in comparison with a building with the same floor space.

For a four-person house, at a constant indoor temperature of 20° C., an average outdoor temperature of −6° C. during the winter months, and an average outdoor temperature of +30° C. during the summer months, it was determined that it is possible to realize an energy gain of approximately 2500 kWh/m².

Figure 2:
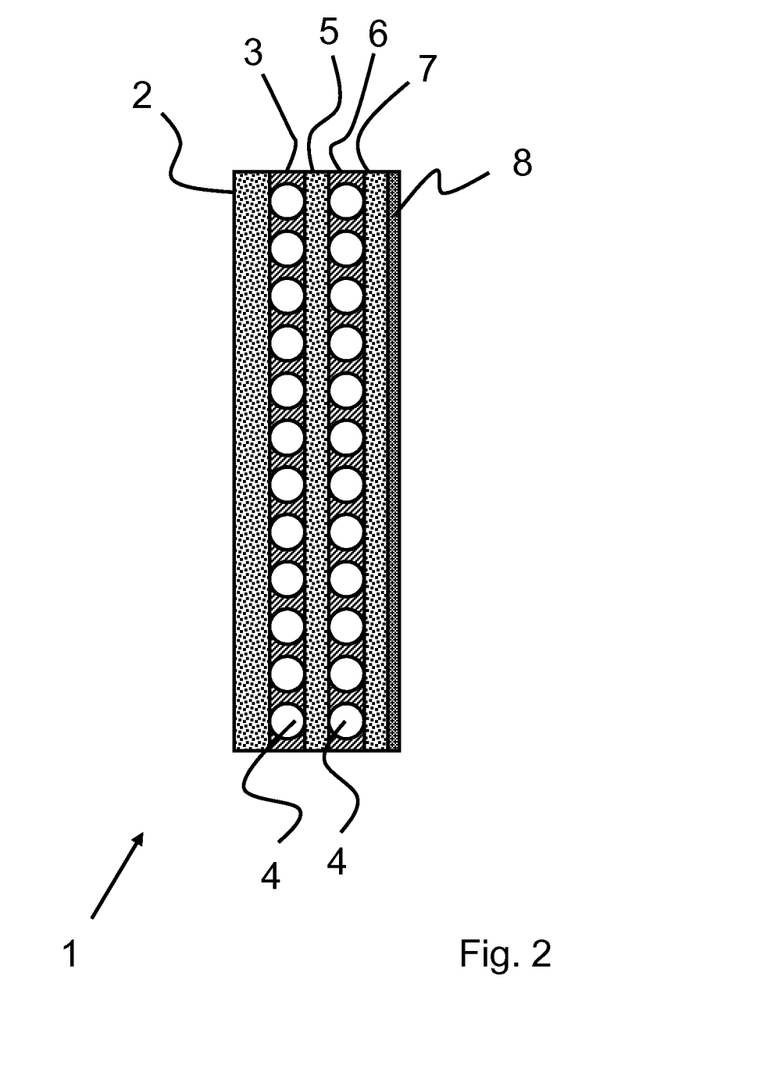
FIG. 2 shows an alternative embodiment of an inventive wall or roof surface element, FIG. 3 schematically shows the integration of inventive wall or roof surface elements into a building, FIG. 4 schematically shows an inventive roof surface element of modular design, and FIG. 5 schematically shows a roof surface element that was manufactured with an inventive method.

FIG. 2 shows an alternative embodiment of the invention. In this case, the wall or roof surface element 1 also features an inner insulating layer 2. An adjacently arranged temperature barrier layer 3 comprises a concrete layer provided with fluid lines 4. This embodiment furthermore features an absorption layer 6 that is also provided with fluid lines and separated from the temperature barrier layer 3 by another insulating layer 5. Another thin insulating layer 7 is arranged on the outer side of the absorption layer 6. An exterior layer 8 of plaster is also provided in this embodiment. According to the invention, the fluid ducts may be realized in the form of plastic pipes or capillary tube mats. In this case, the pipes or mats of the absorption layer 6 respectively have the function of a solar collector. Energy is accumulated during the summer months by means of additional (not-shown) absorption circuits. The outer insulating layer of the exterior wall can be reduced to 2-3 cm and, in connection with an additional insulation between the temperature barrier layer and the absorption layer, makes it possible to realize an exterior insulation with a total thickness of only 4-8 cm.

Figure 3:
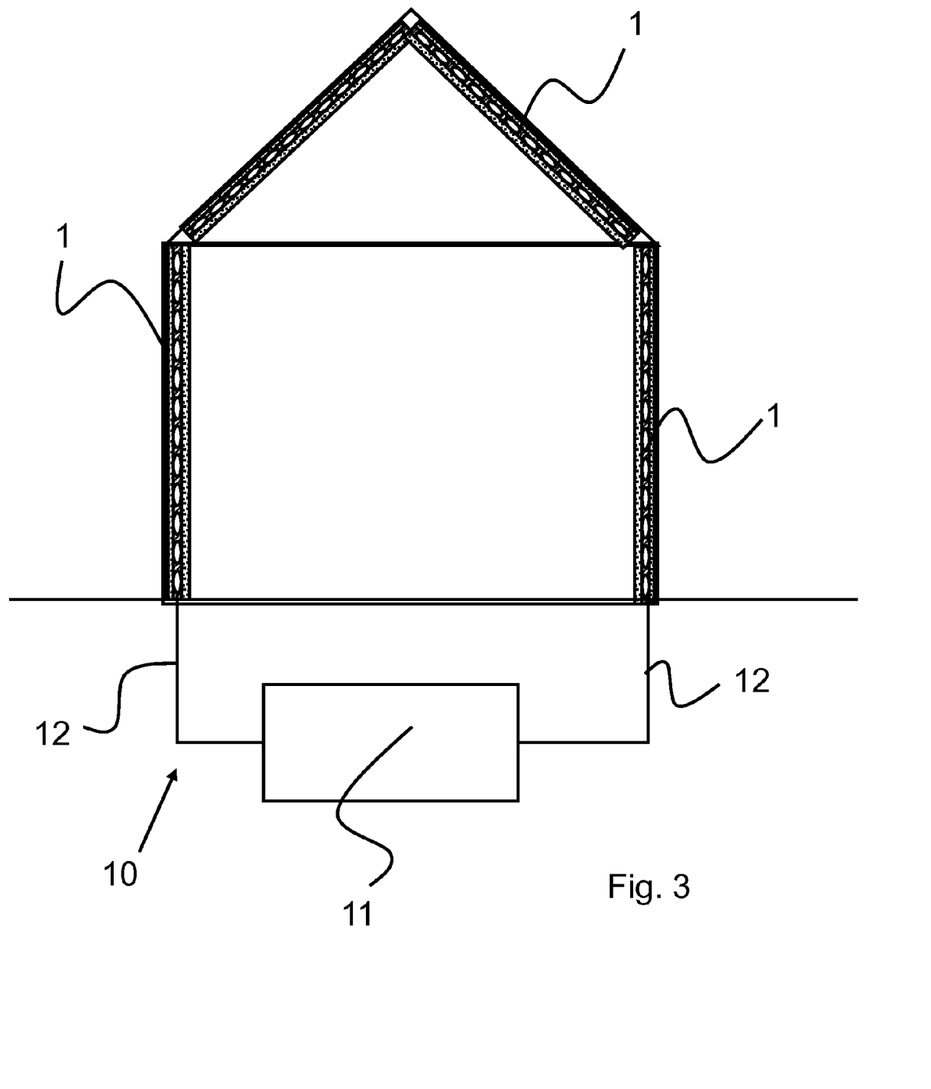

FIG. 3 schematically shows a low-energy house 10 or energy-gain house that is equipped with inventive wall or roof surface elements 1. In the low-energy house 10, the walls as well as the roof are provided with the inventive wall or roof surface elements 1. The wall or roof surface elements 1 are provided with fluid lines 12, in which a water-antifreeze mixture circulates, wherein said fluid lines are connected to an underground reservoir 11 arranged beneath the building.

Figure 4:
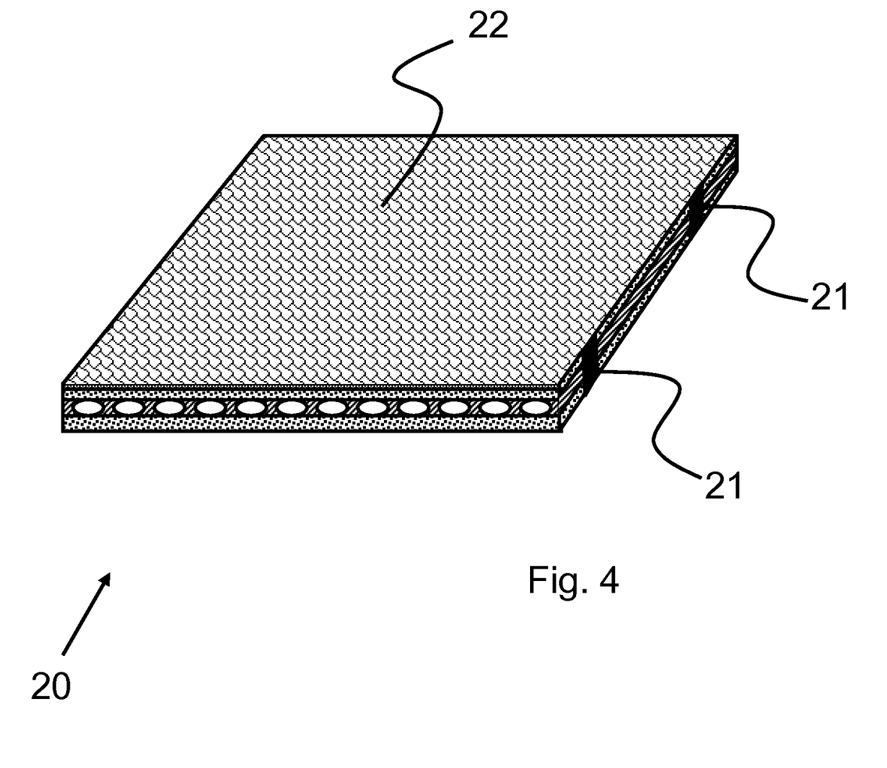

FIG. 4 schematically shows an inventive roof surface element 20 of modular design. The roof surface element basically corresponds to the embodiment of the wall or roof surface element according to FIG. 1. However, the element has a modular design in this case and features lateral grooves 21 for connection to other elements. A structured watertight layer realized in the form of a roof covering 22 is arranged on the upper side as an exterior layer. The roof surface element 20 is realized in a self-contained fashion and features (not-shown) seals along the edges. Consequently, a prefabricated roof can be very quickly constructed by means of inventive roof surface elements 20.

Figure 5:
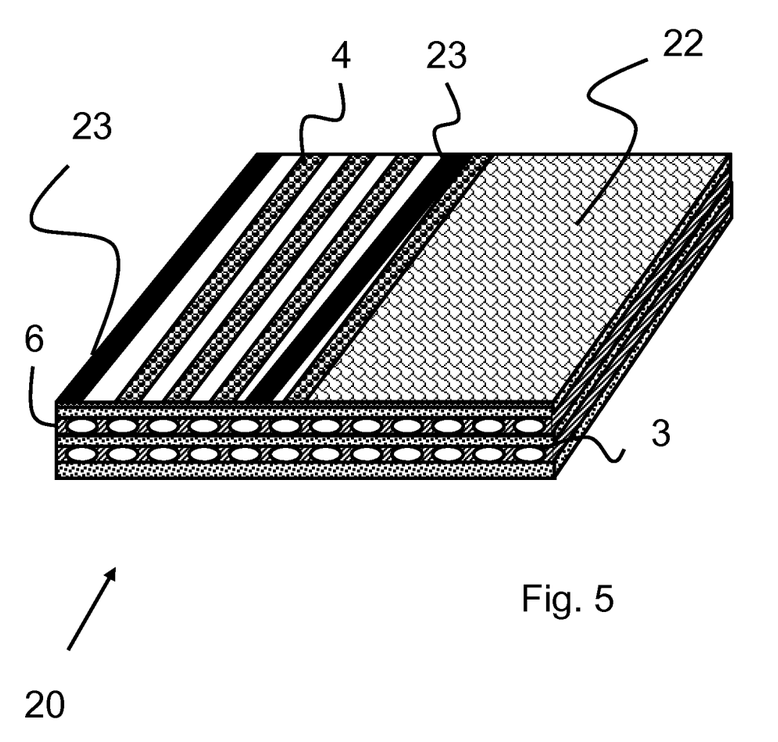

FIG. 5 schematically shows a roof surface element 20 that was manufactured with an inventive method. OSB plates (not-shown) are installed beneath the roof rafters 23. The embodiment of the roof surface element 20 corresponds to the embodiment described with reference to FIG. 2. A temperature barrier layer 3 is sealed in concrete. The absorption layer 6 comprises fluid lines 4 that are installed between the roof rafters. Since the fluid lines 4 of the absorption layer 6 are protected from the effects of the weather by the roof covering 22 arranged thereon, they can be loosely installed and need not be embedded in a sealing compound.

According to the invention, it is possible very easily to construct, in particular, a roof with a (not-shown) absorption layer. In this case, a rafter roof is provided with fiberboards suitable for wallpapering underneath the rafters. The spacing between the rafters ideally amounts to one meter such that polystyrene insulating plates can be inserted between the rafters without having been cut to size. For example, polystyrene plates with a thickness of approximately 5 cm are placed on the OSB plates and, if applicable, foamed and fixed. A temperature barrier consisting of plastic lines is then placed on the polystyrene plates transverse to the rafters in a meandering fashion, wherein the plastic lines are then extended to the ridge of the roof in order to be coupled to a closed circuit via ventilation valves. Alternatively, capillary tube mats may be installed instead of the meandering plastic lines. The space between the rafters is then sealed with a sealing compound and another polystyrene insulating layer with a thickness of 5 cm is applied.

This polystyrene insulating layer is connected to the still fresh sealing compound. Additional plastic lines are then installed on the second polystyrene insulating layer in meandering fashion and connected in order to form an absorption layer. These absorption lines need not necessarily be embedded in a sealing compound because they are protected from environmental influences by the roof covering. The technology therefore can be very easily installed with an extremely thin roof insulation and optimal energy efficiency and used for cooling and heating attic floors.

LIST OF REFERENCE SYMBOLS

1 Wall or roof surface element
2 Insulating layer

3 Temperature barrier layer
4 Fluid line
5 Insulating layer
6 Absorption layer
7 Insulating layer
8 Exterior layer
10 Low-energy house/energy-gain house
11 Heat reservoir
12 Lines
20 Roof surface element
21 Groove
22 Roof covering
23 Roof rafters

What is claimed is:

1. An exterior wall or roof for buildings comprising:
at least a temperature barrier layer that comprises fluid ducts;
at least a first insulating layer arranged outwardly adjacent to the temperature barrier layer;
at least a second insulating layer arranged inwardly adjacent to the temperature barrier layer; and
at least one absorption layer arranged outwardly adjacent to the first insulating layer, wherein the absorption layer comprises fluid ducts that are realized in the form of pipes or capillary tube mats.

2. The exterior wall or roof according to claim 1, wherein at least a third insulating layer is arranged on the outer side of the absorption layer.

3. The exterior wall or roof according to claim 1, wherein the thickness of the first insulating layer and/or the second insulating layer is less than 5 cm.

4. The exterior wall or roof according to claim 1, wherein the temperature barrier layer comprises fluid ducts that are embedded in a concrete core.

5. The exterior wall or roof according to claim 1, wherein the fluid ducts of the temperature barrier layer are realized in the form of pipes or hoses.

6. The exterior wall or roof according to claim 1, wherein the fluid ducts of the temperature barrier layer are realized in the form of polypropylene pipes.

7. The exterior wall or roof according to claim 1, wherein the exterior walls or roof areas are realized in the form of modular panels.

8. The exterior wall or roof according to claim 1, wherein at least one of the first insulating layer and the second insulating later comprises a foamed material.

9. The exterior wall or roof for buildings according to claim 1, wherein the thickness of the exterior wall or roof is less than 35 cm.

10. A wall or roof element in the form of a section of an exterior wall or roof according to claim 1.

11. A low-energy house or energy-gain house comprising an exterior wall or roof for buildings according to claim 1, with at least a temperature barrier layer that comprises fluid ducts and at least one insulating layer, wherein the thickness of the insulating layer on the outer side of the temperature barrier layer amounts to less than 10 cm.

12. The low-energy house or energy-gain house according to claim 11, further comprising at least one heat reservoir that is arranged beneath the low-energy house and connected to the exterior wall or roof by means of fluid lines.

13. The low-energy house or energy-gain house according to claim 12, wherein the fluid lines are filled with a liquid.

* * * * *